(12) United States Patent
Miller (10) Patent No.: US 11,259,519 B2
(45) Date of Patent: Mar. 1, 2022

(54) ARTIFICIAL LICKING BRANCH

(71) Applicant: Hightower Products LLC, Sugarcreek, OH (US)

(72) Inventor: Paul Miller, Sugarcreek, OH (US)

(73) Assignee: HighTower Products LLC, Sugarcreek, OH (US)

( * ) Notice: Subject to any disclaimer, the term of this patent is extended or adjusted under 35 U.S.C. 154(b) by 4 days.

(21) Appl. No.: 16/846,249

(22) Filed: Apr. 10, 2020

(65) Prior Publication Data
US 2021/0315196 A1 Oct. 14, 2021

(51) Int. Cl.
*A01M 31/00* (2006.01)

(52) U.S. Cl.
CPC .................. *A01M 31/008* (2013.01)

(58) Field of Classification Search
CPC ... A01M 31/008; A01K 15/026; A01K 31/00; A41G 1/00; A41G 1/001; A41G 1/007; B68C 2003/005; B68C 2003/0033; B68C 2003/0058
See application file for complete search history.

(56) References Cited

U.S. PATENT DOCUMENTS

| | | | |
|---|---|---|---|
| 8,938,905 B1* | 1/2015 | Moore | A01M 31/06 43/2 |
| 2009/0246241 A1* | 10/2009 | Pitt | A01N 25/34 424/410 |
| 2014/0123538 A1* | 5/2014 | Matheson | A01M 31/06 |
| 2014/0272205 A1* | 9/2014 | Altamura | A41G 1/00 |
| 2017/0135430 A1* | 5/2017 | Chen | A41G 1/00 |
| 2018/0192632 A1* | 7/2018 | Healy | A01M 31/00 |

\* cited by examiner

*Primary Examiner* — Joshua J Michener
*Assistant Examiner* — Henry Hooper Mudd
(74) *Attorney, Agent, or Firm* — Mark C. Johnson; Johnson Dalal (57) ABSTRACT

An artificial licking branch comprising a unitary, portable, and handheld branch body of a polymeric material and a plurality of cantilevered branch members, each projecting outwardly away from the branch body and including an absorbent textile material patch disposed along a portion of the branch member length on each of the plurality of cantilevered branch members. The absorbent textile material is designed to absorb and store natural and synthetic preorbital deer scents or lures for the purpose of indicating deer presence to other deer and for improving hunters' scouting and hunting experience upon their being able to monitor the number and type of deer that physically interact with the artificial licking branch.

17 Claims, 7 Drawing Sheets

ARTIFICIAL LICKING BRANCH

FIELD OF THE INVENTION

The present invention relates generally to licking branches, and, more particularly, relates to artificial licking branches for scouting and hunting of deer.

BACKGROUND OF THE INVENTION

Licking branches, as they are known to those skilled in the art, are generally used as scouting and hunting tools. Specifically, a licking branch is an artificial or natural tree branch that deer apply their unique pre-orbital scent to by biting or rubbing up against the licking branch. Hunters generally use dead tree limbs as licking branches and either hang them down from the higher point of a tree or tie them around a tree trunk or branch. When passing through all year long, deer use the licking branch as a place to deposit their scent so other deer know of their presence in the area. Said differently, it helps bucks in a local bachelor group keep tabs on each other and establish the pecking order. This activity typically picks up during the months leading up to the rut, otherwise known as the chasing phase of the period of the deer rutting season when deer are most sexually assertive.

At times, a licking branch may be used or set up in conjunction with a scrape. As the name suggests, a scrape is an area on the forest floor where deer have scraped the ground using their hooves for the purpose of further depositing their unique scent therein. Bucks, especially mature bucks, will pick up on the scent left by other deer, understand that those animals will likely be competing with them during the rut, and begin scraping the ground and leaving other scents at the site. Scrapes may be located in the woods near travel corridors and doe bedding areas. Some hunters elect to set up makeshift scrapes along with licking branches to create a more natural and realistic environment for the animals. As such, more deer will pass by and deposit their scent, alerting hunters to the number and type of deer in the area. This, in turn, assists hunters in finding and/or creating prime locations to monitor and hunt in.

Hunters are typically forced to scout a wooded area to find and collect dead tree limbs that they then use as makeshift licking branches. This process, however, can often be time-consuming and inconvenient due to inclement weather or a lack of fallen tree limbs. Scouting for an acceptable licking branch divests hunters of valuable time that they could be using to actually hunt the target animals. Further, because a tree branch is comprised of organic matter, dead tree limbs serve as short-term and temporary licking branches that naturally decompose or break down from inclement weather or wear and tear. As such, hunters are forced to continually seek out additional licking branches to replace those that will inevitably deteriorate to the point where they can no longer serve their intended purpose.

Therefore, a need exists to overcome the problems with the prior art as discussed above.

SUMMARY OF THE INVENTION

The invention provides an artificial licking branch that overcomes the hereinafore-mentioned disadvantages of the heretofore-known devices and methods of this general type and that serves as a convenient and long-term solution for hunters seeking to improve their scouting or hunting experience. More specifically, the present invention provides a durable and flexible artificial licking branch that hunters can attach to a tree trunk or branch to attract deer and create a point of non-contact, social interaction between them for the purpose of monitoring the number and type(s) of deer that are present in the area. This artificial licking branch saves hunters considerable time in having to find an acceptable tree limb in nature and in optimizing the structure and elements of the licking branch.

With the foregoing and other objects in view, there is provided, in accordance with the invention, an artificial licking branch comprising a unitary, portable, and handheld branch body of a polymeric material and with a lower terminal free end and a plurality of cantilevered branch members, each projecting outwardly away from the branch body, including a first branch end, including a second branch terminal free end opposite the lower terminal free end, and defining a branch member length.

In accordance with a further feature of the present invention, there is also provided an absorbent textile material patch disposed along a portion of the branch member length on each of the plurality of cantilevered branch members.

In accordance with another feature, an embodiment of the present invention includes cantilevered branch members which are curvilinear in shape and form.

In accordance with a further feature of the present invention, the branch body may be of a flexible rubber material.

In accordance with a further feature of the present invention, two absorbent textile material patches may be disposed along a portion of the branch member length on opposing sides of each of the plurality of cantilevered branch members. The two absorbent textile material patches may further be disposed proximal to the second branch terminal free end on each of the plurality of cantilevered branch members.

In accordance with another feature, one embodiment of the present invention includes each of the plurality of cantilevered branch members further comprising two opposing and enclosed branch apertures separated by a branch channel, the two absorbent textile material patches disposed respectively in the two opposing and enclosed branch apertures and in the branch channel.

In accordance another embodiment of the present invention, the two absorbent textile material patches may be of a felt material.

In accordance with yet another embodiment of the present invention, the absorbent textile material patches are disposed proximal to the second branch terminal free end on each of the plurality of cantilevered branch members.

In accordance with a further embodiment, the branch body may further comprise two opposing and enclosed body retention apertures separated by a body channel, the two opposing and enclosed body retention apertures interposed between a first branch end of one of the plurality of cantilevered branch members and the lower terminal free end of the branch body.

In yet another embodiment, the artificial licking branch may include at least one tie strap which may be of a rubber-coated metallic wire material or of a diameter less than a diameter of the two opposing and enclosed body retention apertures and the body channel.

In alternate embodiments, the branch body comprises a set of two opposing and enclosed body retention apertures separated by a body channel, the set of the two opposing and enclosed body retention apertures interposed between a first branch end of one of the plurality of cantilevered branch members and the lower terminal free end of the branch body. One of the sets of two opposing and enclosed body retention apertures may be disposed proximal to the lower terminal free end of the branch body.

In certain embodiments, the at least one tie strap comprises a first free end and a second free end, wherein the first free end and the second free end may be selectively coupled together around the branch body or around one of the plurality of cantilevered branch members. In other embodiments, the at least one tie strap is continuously annular in shape and selectively expandable in diameter.

In accordance with a further embodiment, the branch body and the plurality of cantilevered branch members may be cylindrical.

Although the invention is illustrated and described herein as embodied in an artificial licking branch, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the artificial licking branch. The term "traverse" should be understood to mean in a direction corresponding to a horizontal orientation across the artificial licking branch.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient tool for the purpose of assisting hunters in scouting and hunting animals, namely, deer. Embodiments of the invention provide a durable and flexible artificial licking branch that hunters can attach to a tree trunk or branch to attract deer and create a point of non-contact, social interaction between the deer for the purpose of monitoring the number and type(s) of deer that are present in the area. In addition, embodiments of the invention provide an absorbent textile material patch disposed along the body and branches of the artificial licking branch, for the purpose of absorbing and emitting the unique scent of each animal that interacts with the artificial licking branch or a manufactured scent that mimics the scent of a fellow deer.

Figure 1:
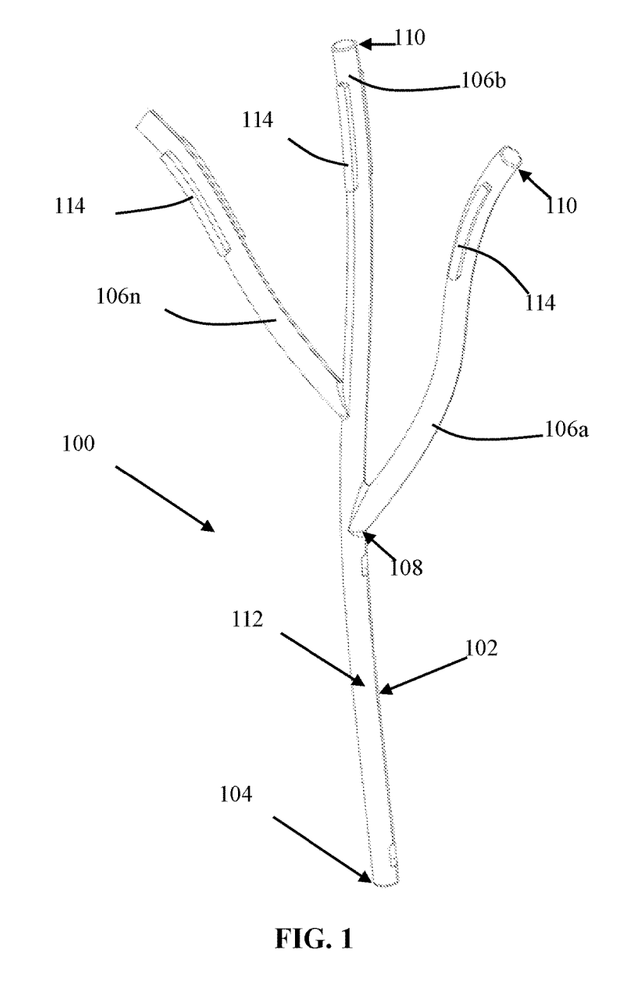
FIG. 1 is an elevational front view of an artificial licking branch, in accordance with the present invention.

Referring now to FIG. 1, one embodiment of the present invention is shown in an elevational front view. FIG. 1 shows several advantageous features of the present invention, but, as will be described below, the invention can be provided in several shapes, sizes, combinations of features and components, and varying numbers and functions of the components. The first example of an artificial licking branch 100, as shown in FIG. 1, comprises a unitary, portable, and handheld branch body 102 (hereinafter referred to as "branch body 102") and a plurality of cantilevered branch members 106a-n, wherein "n" refers to any number greater than one. As used herein, portable should be generally understood as referring to the ability to be easily carried or moved. Handheld should be generally understood as being light enough in weight so as to be easily maneuvered by a user's hands. Although the dimensions vary in alternate embodiments, in an exemplary embodiment the branch body 102 is approximately 11 inches in length.

Figure 4:
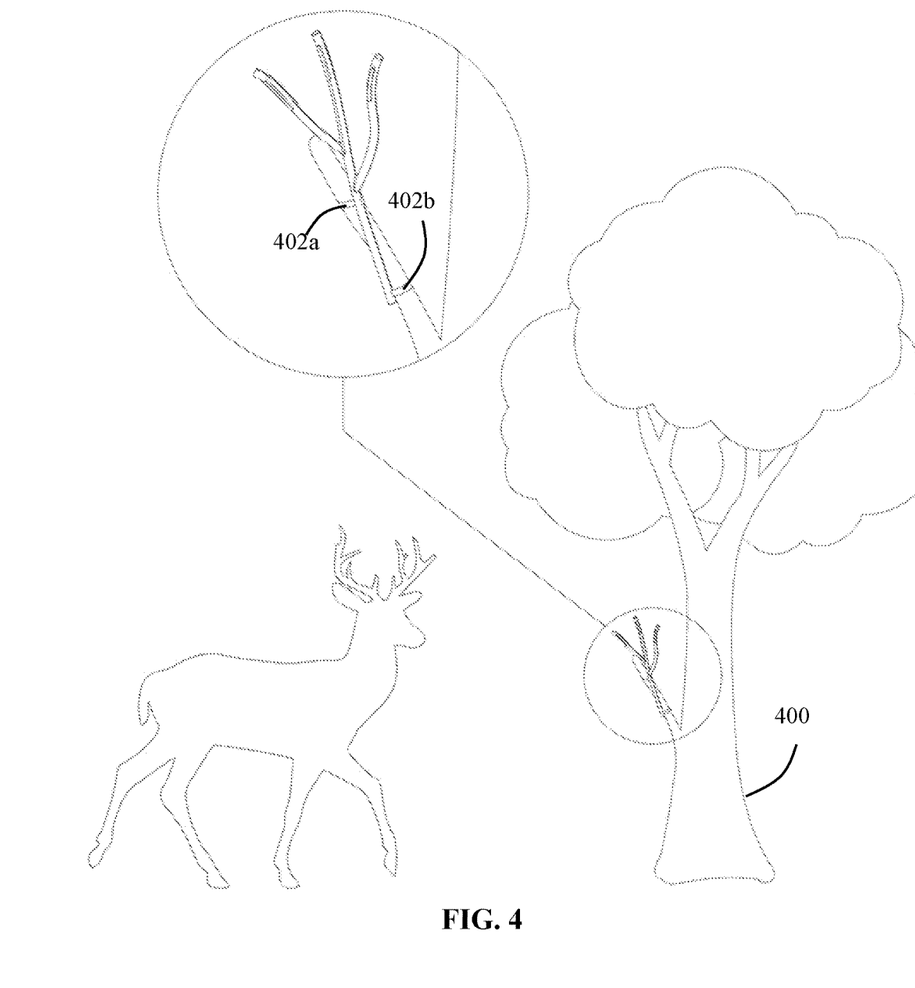
FIG. 4 is a fragmentary and elevational front view of an artificial licking branch, in accordance with the present invention.

It should be understood that terms such as, "front," "rear," "side," "top," "bottom," and the like are indicated from the reference point of a viewer viewing the artificial licking branch 100 when disposed on a tree 400, bush, or other structure (see FIG. 4).

Figure 2:
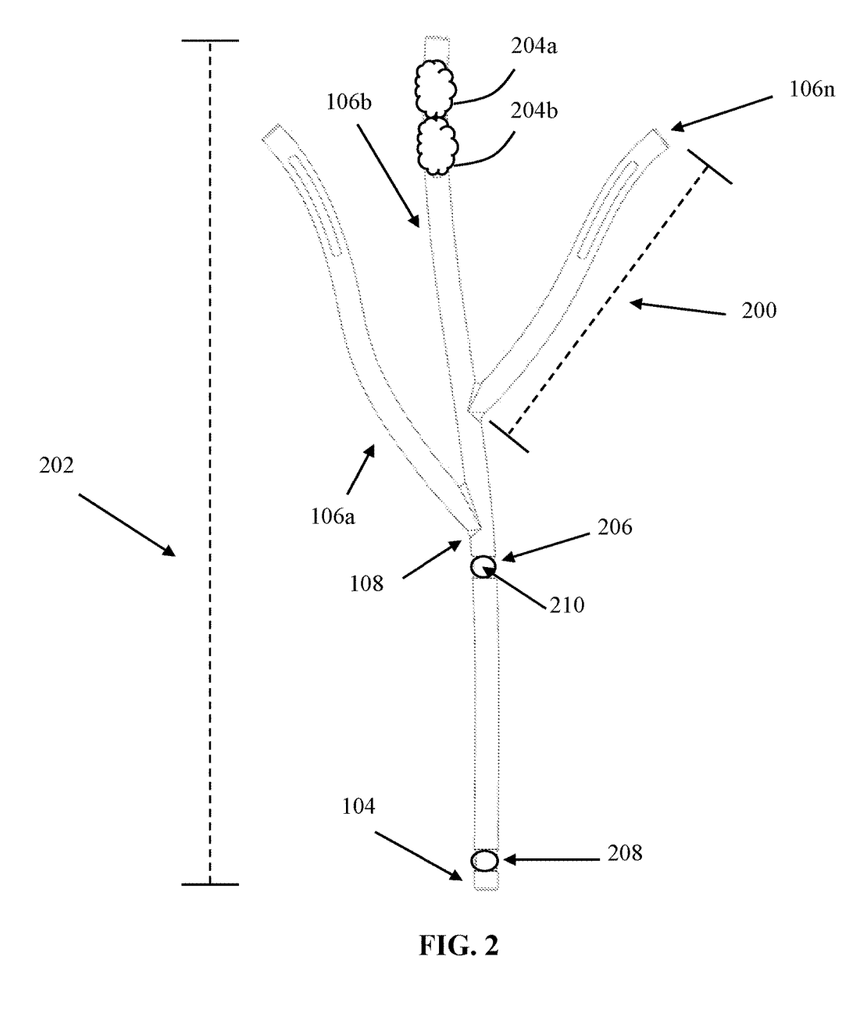
FIG. 2 is a perspective front view of an artificial licking branch, in accordance with the present invention.

In accordance with a further feature, the branch body 102 is of a polymeric material and with a lower terminal free end 104 and a plurality of cantilevered branch members 106a-n, wherein "n" refers to any number greater than one, each projecting outwardly away from the branch body 102, including a first branch end 108, including a second branch terminal free end 110 opposite the lower terminal free end 104, and defining a branch member length 200 (as seen in FIG. 2). In an exemplary embodiment, the branch body 102 is of a flexible polymeric material consisting of a polymer of isoprene with a molecular weight of 100,000 to 1,000,000, more commonly known as rubber. As used herein, flexible is generally defined as capable of repeated bending without polymeric deformation or mechanical failure. In other embodiments, however, the polymeric material may vary in type and nature to meet more specific user needs, such as a heavier unit weight or greater structural flexibility. Use of the polymeric material is significant in that it ensures a relatively lightweight artificial licking branch 100 that may easily be hung from the tree 400, branch or other natural structure without substantially weighing down said structure to the point of breakage or deformation. Because the artificial licking branch 100 is designed and intended to hang from the tree 400 or to be tied or otherwise attached to a part of the tree 400, the weight of the artificial licking branch 100 must not exceed that of the structure to which it is attached. Composing the artificial licking branch 100 out of a polymeric material helps achieve this goal.

A user may adjust the orientation of the artificial licking branch 100 in such a way that the lower terminal free end 104 faces down, up, or diagonally. Said differently, the orientation of the artificial licking branch 100 as a whole may be longitudinal, traverse, or diagonal depending on the desired placement by the user. This flexibility allows users to use the artificial licking branch 100 in a variety of different placements and orientations, thereby maximizing the utility of the present invention.

The plurality of cantilevered branch members 106a-n project outwardly away from the branch body 102 so as to cover a greater square footage of space on the tree 400 or natural structure and to mimic the natural shape and form of tree branches and limbs. Since the artificial licking branch 100 is intended to deceive animals, namely deer, into believing that the artificial licking branch 100 is a naturally occurring element of the natural environment around it, as opposed to an artificial or man-made tool strategically placed by a user, the plurality of cantilevered branch members 106a-n project outward from the branch body 102 in the same way that a tree branch extends outward from a tree trunk or larger branch. This unique structure also maximizes the square footage that the artificial licking branch 100 covers on the tree 400 in order to increase the chances that a large number of deer will reach the plurality of cantilevered branch members 106a-n and physically interact with them by biting or rubbing up against them to leave their scent. It is for these two reasons that alternate embodiments of the present invention may feature the plurality of cantilevered branch members 106a-n or the branch body 102 as curvilinear or cylindrical in shape and form, better mimicking the natural shape and form of naturally occurring tree branches and limbs. In exemplary embodiments, the plurality of cantilevered branch members 106a-n are between approximately 0.2 and 0.3 inches in width, though these dimensions vary in other embodiments.

As with the branch body 102, the plurality of cantilevered branch members 106a-n may be of a polymeric material consisting of a polymer of isoprene with a molecular weight of 100,000 to 1,000,000, more commonly known as rubber. In other embodiments, however, the polymeric material may vary in type and nature to meet more specific user needs, such as a heavier unit weight or less structural flexibility.

As best seen in FIGS. 1 and 2, a first branch end 108 and a second branch terminal free end 110 opposite the lower terminal free end 104 define a branch member length 200 which spans in length from the first branch end 108 to the second branch terminal free end 110. In some embodiments, the branch member length 200 is shorter than a branch body length 202, spanning in length from the lower terminal free end 104 to the second branch terminal free end 110 of the branch body 102. The first branch end 108 is connected, affixed, or otherwise attached to the branch body 102 through a variety of means such as an adhesive, a fastener, or another attachment means. In an exemplary embodiment, the first branch end 108 is welded to the branch body 102 through ultrasonic welding, known to those skilled in the art as an industrial technique or process whereby high-frequency ultrasonic acoustic vibrations are locally applied to workpieces being held together under pressure to create a solid-state weld. It is commonly used for joining polymeric material compositions such as the one that the branch body 102 and the plurality of cantilevered branch members 106a-n are comprised of.

In accordance with a further feature of the present invention, there is also provided a singular absorbent textile material patch 114 disposed along a portion of the branch member length 200 on each of the plurality of cantilevered branch members 106a-n. As used herein, textile refers to a flexible material consisting of a network of natural or artificial fibers, such as yarn or thread. In an exemplary embodiment, the textile material comprising the absorbent textile material patch 114 may be of a felt material, wherein felt is generally defined as a textile material that is produced by matting, condensing and pressing fibers together. Felt may be made of natural fibers such as wool or animal fur, or from synthetic fibers such as petroleum-based acrylic or acrylonitrile or wood pulp-based rayon. These absorbent properties and textile material compositions are significant to the utility and efficacy of the artificial licking branch 100 insofar as they are capable of absorbing and storing not only the unique scent of each deer that interacts with the absorbent textile material patch 114, but also the synthetic pre-orbital scent or lure that users may purchase separately and apply directly onto the absorbent textile material patch 114. Upon application, the felt or textile material absorbs and holds the synthetic scent so that deer that later interact with the artificial licking branch 100 will be under the impression that other deer are also present in the area.

As best seen in FIG. 2, another exemplary embodiment features two absorbent textile material patches 204a, 204b disposed along a portion of the branch member length 200 on opposing sides of each of the plurality of cantilevered branch members 106a-n. The two absorbent textile material patches 204a, 204b may further be disposed proximal to the second branch terminal free end 110 on each of the plurality of cantilevered branch members 106a-n. Having two separate absorbent textile material patches 204a, 204b allows users to apply two separate synthetic preorbitant scents or lures, one to each of the two absorbent textile material patches 204a, 204b, without mixing or diluting the scents. In turn, this may assist hunters in generating greater deer foot traffic around the artificial licking branch 100, thereby creating additional targets for hunting purposes.

The singular absorbent textile material patch 114 or, in other embodiments, the two absorbent textile material patches 204a, 204b, are disposed proximal to the second branch terminal free end 110 on each of the plurality of cantilevered branch members 106a-n. As used herein (unless otherwise specified or inferred from the drawings), the term "proximal" is defined as at or within forty percent (40%) of the second branch terminal free end 110 of each of the plurality of the cantilevered branch members 106a-n. This placement ensures that the natural or synthetic preorbital deer scent is evenly distributed and reaches all ends of the plurality of cantilevered branch members 106a-n. An even distribution of the scent makes for a more effective licking branch as deer can easily ascertain the variety of different scents therein.

Figure 3:
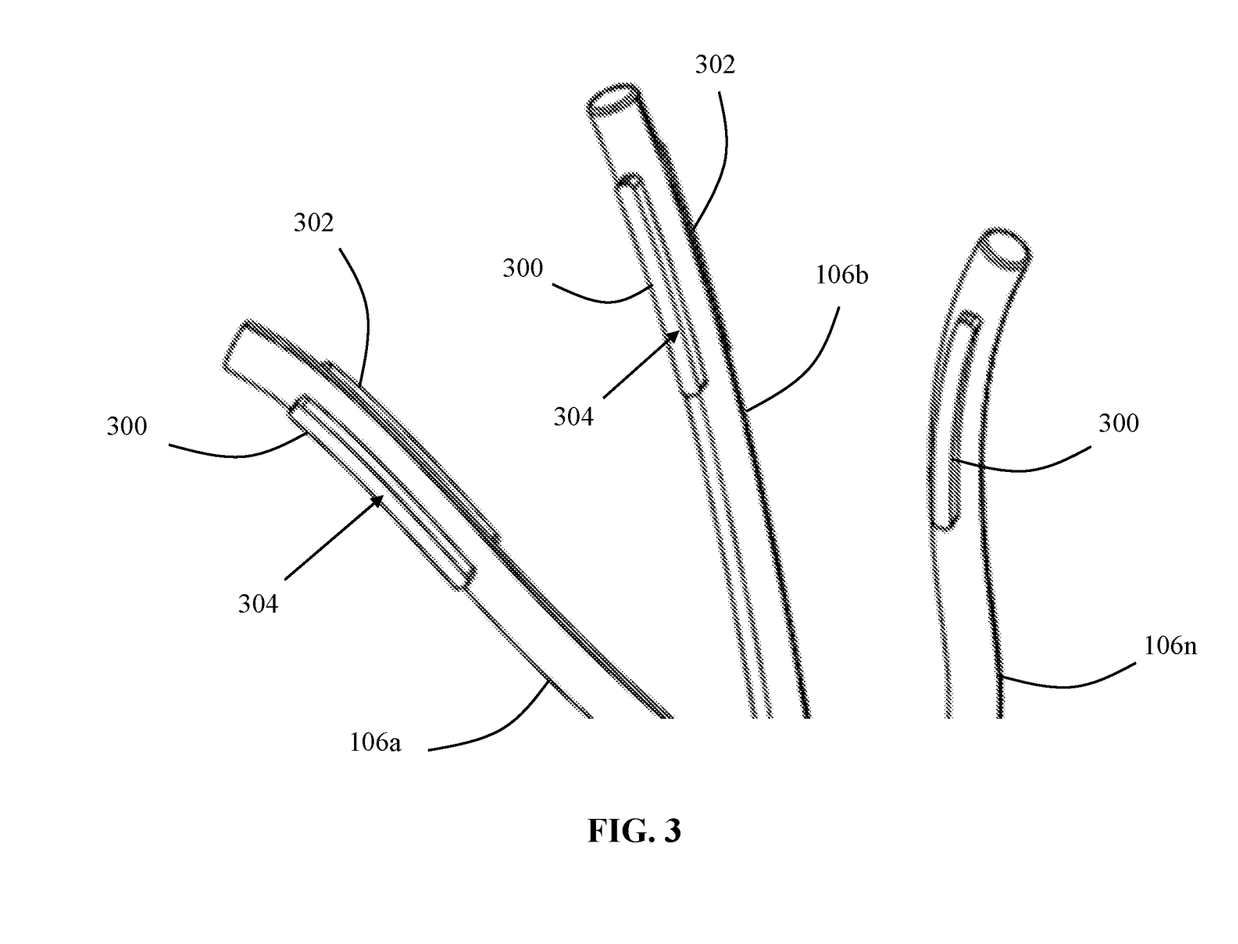
FIG. 3 is a close-up perspective view of an artificial licking branch, in accordance with the present invention.

As best seen in FIG. 3, each of the plurality of cantilevered branch members 106a-n further comprise two opposing and enclosed branch apertures 300, 302 separated by a branch channel 304, the two absorbent textile material patches 204a, 204b disposed respectively in the two opposing and enclosed branch apertures 300, 302 and in the branch channel 304. The two absorbent textile material patches 204a, 204b or in some embodiments the singular absorbent textile material patch 114, may be retained in the two opposing and enclosed branch apertures 300, 302 and in the branch channel 304 using a variety of different attachment means, such as friction/compression and/or adhesive and/or other fasteners (or a combination of the same). Friction refers to the resistance that one surface or object encounters when moving over another and compression refers to the action of flattening by pressure such as by squeezing or pressing. An adhesive such as glue, cement, mucilage, or paste may be used in alternate embodiments. The two opposing and enclosed branch apertures 300, 302 are designed to expand the surface area on the artificial licking branch 100 that contains or houses the two absorbent textile material patches 204a, 204b. The branch channel 304 may provide additional surface area and volume to house more of the absorbent textile material patch 114 or it may function to divide or separate the two absorbent textile material patches 204a, 204b disposed on each of the two opposing and enclosed branch apertures 300, 302. In exemplary embodiments, the two opposing and enclosed branch apertures 300, 302 and branch channel 304 may be approximately 0.1 inches wide and 1.3-1.5 inches long. These dimensions are subject to change in different embodiments of the present invention.

Figure 5:
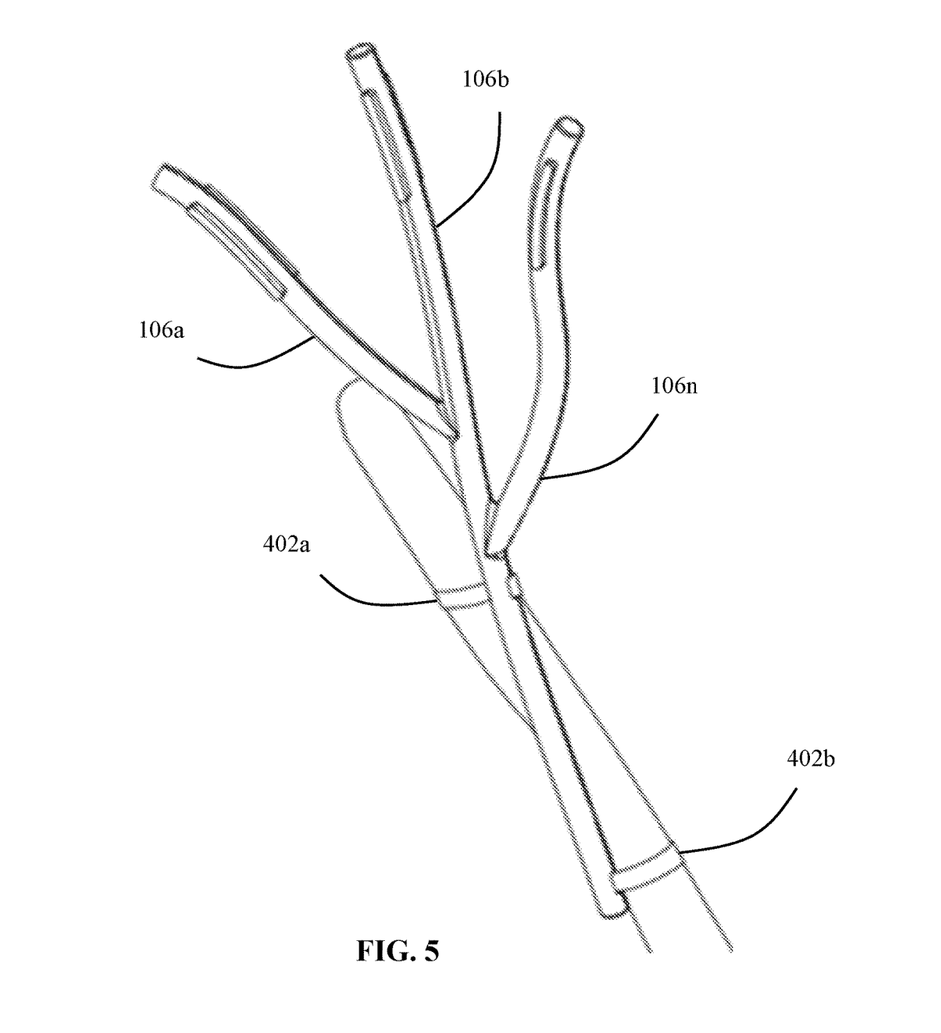
FIG. 5 is a perspective front view of an artificial licking branch, in accordance with the present invention.

As best seen in FIG. 2, in one embodiment of the present invention the branch body 102 may further comprise two opposing and enclosed body retention apertures 206, 208 separated by a body channel 210, the two opposing and enclosed body retention apertures 206, 208 interposed between a first branch end 108 of one of the plurality of cantilevered branch members 106a-n and the lower terminal free end 104 of the branch body 102. The two opposing and enclosed body retention apertures 206, 208 provide a means of attaching the artificial licking branch 100 to the tree 400. Specifically, and as best seen in FIGS. 4 and 5, the two opposing and enclosed body retention apertures 206, 208 are used in conjunction with at least one tie strap 402a-n, wherein "n" refers to any number greater than one, to attach and secure the artificial licking branch 100 to the tree 400 or other natural structure. In an exemplary embodiment, two tie straps 402a, 402b are used wherein one tie strap 402a, 402b is inserted through the body channel 210 defined by each of the two opposing and enclosed body retention apertures 206, 208 and then tied around the branch body 102 for structural support and stability.

In an exemplary embodiment, the at least one tie strap 402a-n may be of a rubber-coated metallic wire material or of a diameter less than a diameter of the two opposing and enclosed body retention apertures 206, 208 and of the body channel 210. The rubber-coated metallic wire material provides the flexibility and durability required to smoothly, and with no obstructions, insert the at least one tie strap 402a-n through the body channel 210 and to support the weight of the artificial licking branch 100 when tied or otherwise affixed to the tree 400 for long periods of time. The diameter of the at least one tie strap 402a-n must be less than the diameter of the two opposing and enclosed body retention apertures 206, 208 and of the body channel 210 so that the at least one tie strap 402a-n can be smoothly and easily inserted within and through the body channel 210. In other embodiments, the at least one tie strap 402a-n may simply be tied around the circumference of the branch body 102 or around the circumference of at least one of the plurality of cantilevered branch members 106a-n, rather than being inserted into and through the body channel 210. In such embodiments, the diameter of the at least one tie strap 402a-n need not necessarily be less than the diameter of the two opposing and enclosed body retention apertures 206, 208 and of the body channel 210, but it should nevertheless be no more than one inch long to ensure a close and snug fit around, and secure grip on, the circumference of the branch body 102 or the at least one of the plurality of cantilevered branch members 106a-n.

One of the set of two opposing and enclosed body retention apertures 206, 208 may be disposed proximal to the lower terminal free end 104 of the branch body 102 to facilitate a snug and secure attachment of the artificial licking branch 100 to the tree 400 that is able to sustain the full and prolonged weight of the artificial licking branch 100 during use.

Figure 6:
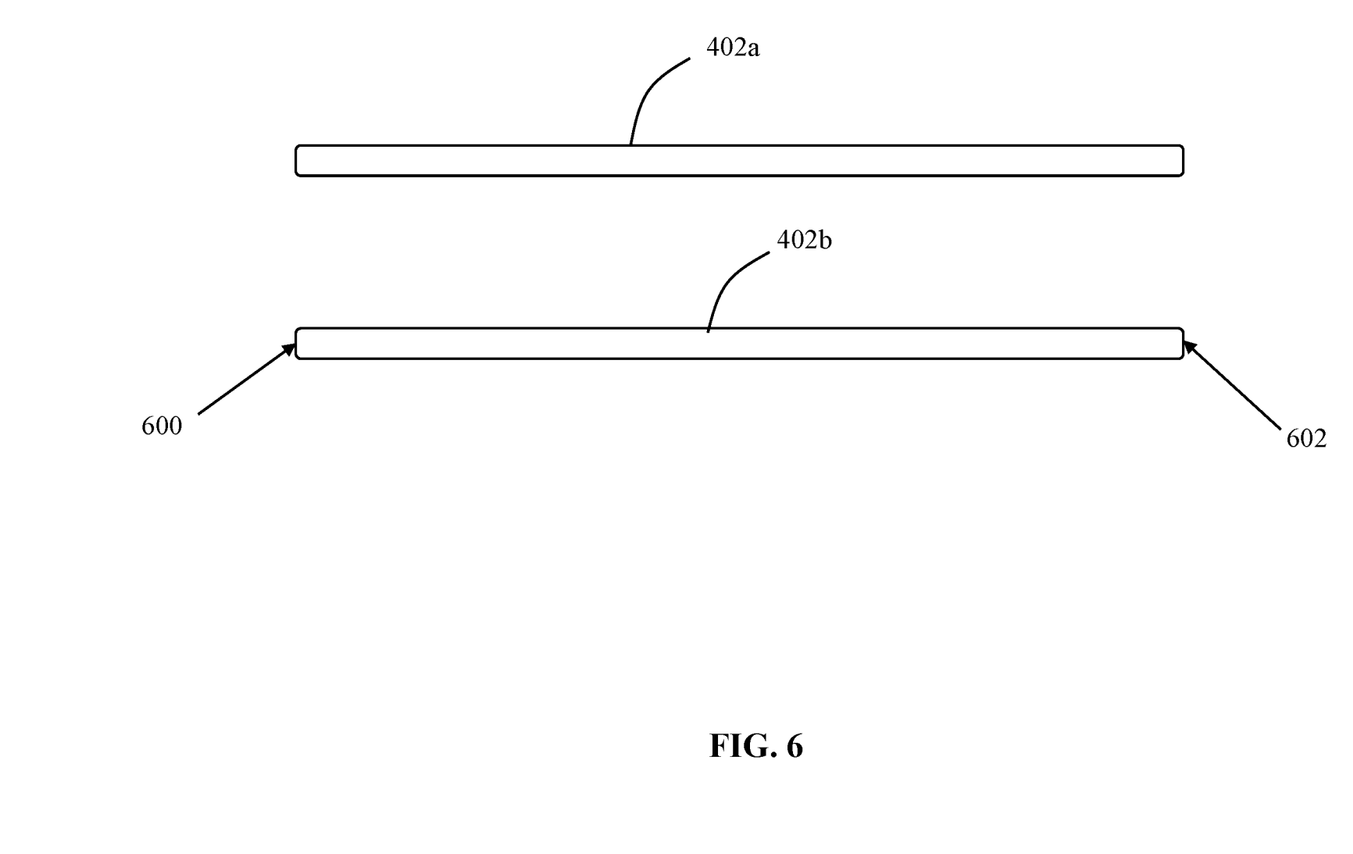
FIG. 6 is an elevational front view of two tie straps, in accordance with the present invention.

In certain embodiments, the at least one tie strap 402a-n comprises a first free end 600 and a second free end 602, wherein the first free end 600 and the second free end 602 may be selectively coupled together around the branch body 102 or around one of the plurality of cantilevered branch members 106a-n. This feature provides users with an additional method of selectively coupling the artificial licking branch 100 to the tree 400 or other natural structure. In other embodiments, the at least one tie strap 402a-n is continuously annular, or ring-shaped, and is selectively expandable in diameter. In these embodiments, the at least one tie strap 402a-n comprises one continuous piece that may be of an elastomeric composition, generally defined as a class of polymer materials with high elastic, or expandable, nature.

This enables users to attach the absorbent textile material patch 114 onto the at least one tie strap 402*a-n*, through an adhesive, connector, fastener, or other connective tool or method, and then expand the diameter of the at least one tie strap 402*a-n* and slide it through and around the branch body 102 or the plurality of cantilevered branch members 106*a-n*.

Figure 7:
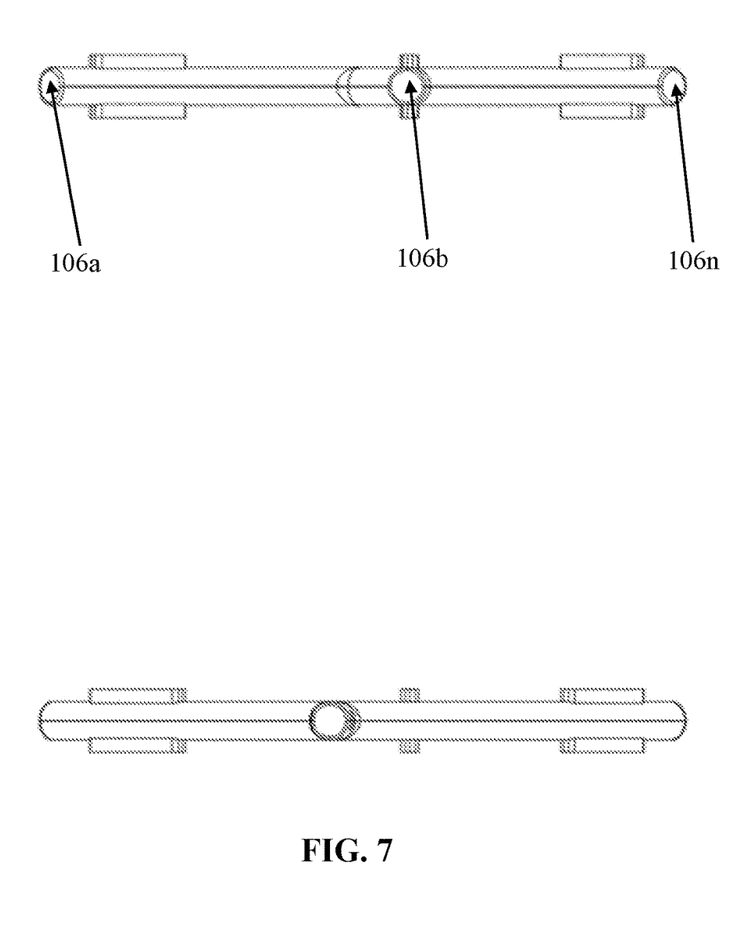
FIG. 7 is a top plan view of the artificial licking branch, in accordance with an exemplary embodiment of the present invention.
Figure 8:
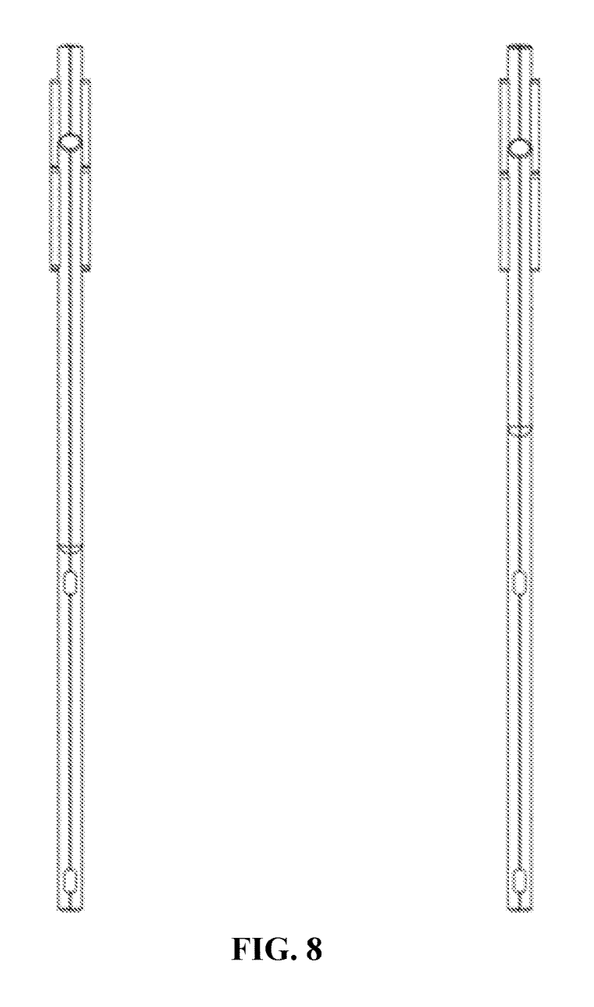
FIG. 8 is a side plan view of the artificial licking branch, in accordance with the present invention.

FIG. 7 is a top plan view of an exemplary embodiment of the artificial licking branch 100 whereas FIG. 8 is a side plan view of an exemplary embodiment of the artificial licking branch 100.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. An artificial licking branch comprising:
   a unitary, portable, and handheld branch body of a polymeric material and with a lower terminal free end and a plurality of cantilevered branch members each projecting outwardly away from the branch body, defining two opposing and enclosed body retention apertures separated by a body channel, including a first branch end, including a second branch terminal free end opposite the lower terminal free end, and defining a branch member length, the two opposing and enclosed body retention apertures interposed between the first branch end of one of the plurality of cantilevered branch members and the lower terminal free end of the branch body; and
   an absorbent textile material patch disposed along a portion of the branch member length on each of the plurality of cantilevered branch members.

2. The artificial licking branch according to claim 1, wherein:
   the cantilevered branch members are curvilinear.

3. The artificial licking branch according to claim 1, wherein:
   the branch body is of a flexible rubber material.

4. The artificial licking branch according to claim 1, further comprising:
   two absorbent textile material patches disposed along a portion of the branch member length on opposing sides of each of the plurality of cantilevered branch members.

5. The artificial licking branch according to claim 4, wherein:
   the two absorbent textile material patches are disposed proximal to the second branch terminal free end on each of the plurality of cantilevered branch members.

6. The artificial licking branch according to claim 4, wherein each of the plurality of cantilevered branch members further comprise:
   two opposing and enclosed branch apertures separated by a branch channel, the two absorbent textile material patches are disposed respectively in the two opposing and enclosed branch apertures and in the branch channel.

7. The artificial licking branch according to claim 6, wherein:
   the two absorbent textile material patches are of a felt material.

8. The artificial licking branch according to claim 1, wherein:
   the absorbent textile material patch is disposed proximal to the second branch terminal free end on each of the plurality of cantilevered branch members.

9. The artificial licking branch according to claim 1, further comprising:
   at least one tie strap of a diameter less than a diameter of the two opposing and enclosed body retention apertures and the body channel.

10. The artificial licking branch according to claim 9, wherein:
    the at least one tie strap is of a rubber-coated metallic wire material.

11. The artificial licking branch according to claim 1, wherein the branch body further comprises:
    a set of two opposing and enclosed body retention apertures separated by a body channel, the set of the two opposing and enclosed body retention apertures interposed between a first branch end of one of the plurality of cantilevered branch members and the lower terminal free end of the branch body.

12. The artificial licking branch according to claim 11, wherein:
    one of the set of two opposing and enclosed body retention apertures is disposed proximal to the lower terminal free end of the branch body.

13. The artificial licking branch according to claim 9, wherein:
    the at least one tie strap comprises a first free end and a second free end.

14. The artificial licking branch according to claim 9, wherein:
    the at least one tie strap is continuously annular in shape and selectively expandable in diameter.

15. The artificial licking branch according to claim 1, wherein:
    the branch body and the plurality of cantilevered branch members are cylindrical.

16. An artificial licking branch comprising:
    a unitary, portable, and handheld branch body of a polymeric material and with a lower terminal free end and a plurality of cantilevered branch members each projecting outwardly away from the branch body, each with two opposing and enclosed branch apertures separated by a branch channel, including a first branch end, including a second branch terminal free end opposite the lower terminal free end, and defining a branch member length; and
    two absorbent textile material patches disposed along a portion of the branch member length, disposed respectively in the two opposing and enclosed branch apertures and in the branch channel, and on opposing sides of the plurality of cantilevered branch members.

17. An artificial licking branch comprising:
    a unitary, portable, and handheld branch body with a lower terminal free end and a plurality of cantilevered branch members each projecting outwardly away from the branch body, each defining a set of two opposing and enclosed body retention apertures separated by a body channel, including a first branch end, including a second branch terminal free end opposite the lower terminal free end, and defining a branch member length, the set of the two opposing and enclosed body retention apertures interposed between the first branch end of one of the plurality of cantilevered branch members and the lower terminal free end of the branch body; and an absorbent textile material patch disposed along a portion of the branch member length on each of the plurality of cantilevered branch members.

\* \* \* \* \*